Sept. 4, 1962 E. W. STUDT 3,052,033
CIRCLE SCRIBER
Filed Oct. 5, 1959 2 Sheets-Sheet 1
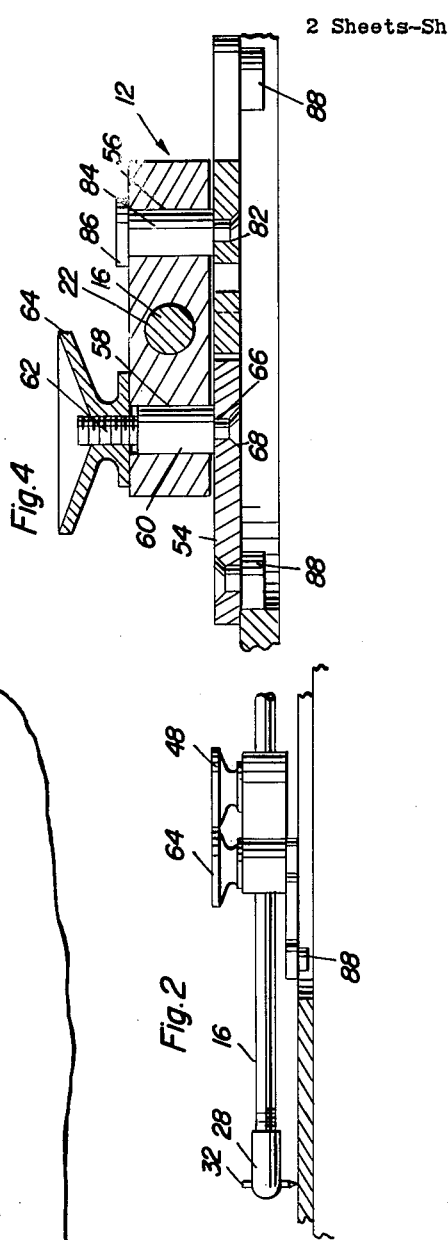
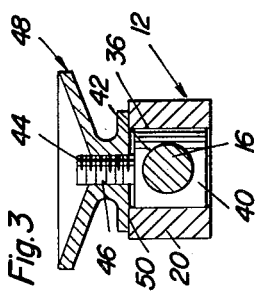
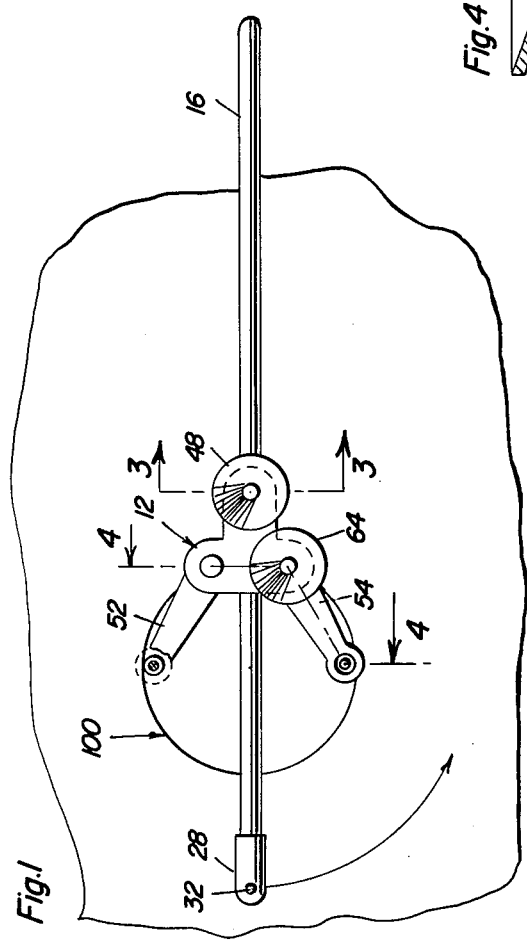
Edwin W. Studt
INVENTOR.

Sept. 4, 1962 E. W. STUDT 3,052,033
CIRCLE SCRIBER
Filed Oct. 5, 1959 2 Sheets-Sheet 2
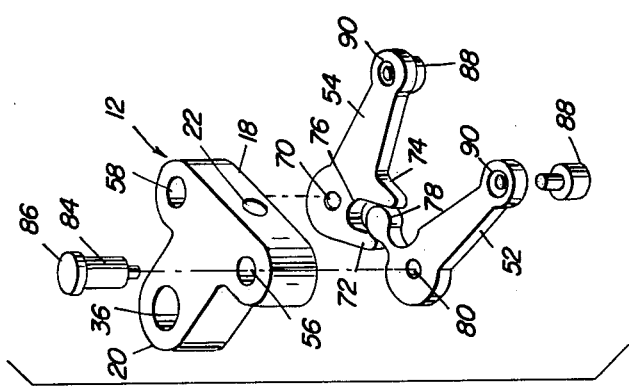
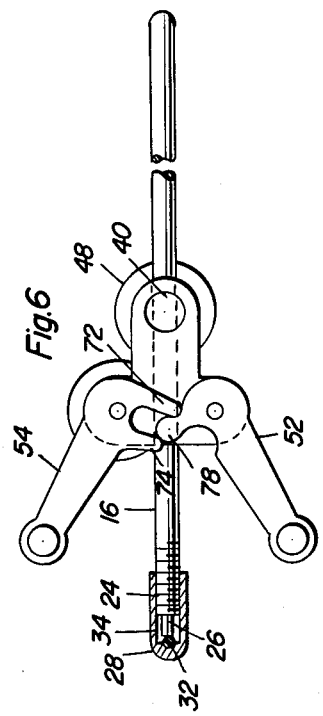
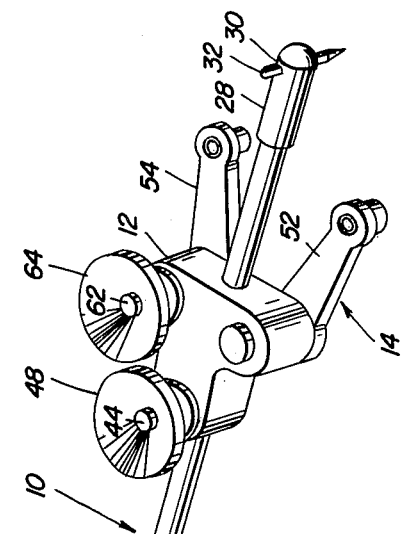
Edwin W. Studt
INVENTOR.
BY *Clarence A. O'Brien*
*and Harvey B. Jacobson*
Attorneys United States Patent Office 3,052,033
Patented Sept. 4, 1962

3,052,033
CIRCLE SCRIBER
Edwin W. Studt, 608 N. Maria Ave.,
Redondo Beach, Calif.
Filed Oct. 5, 1959, Ser. No. 844,494
7 Claims. (Cl. 33—42)

This invention relates generally to hand tools and more particularly to a novel scribing instrument enabling the user to scribe various lines accurately.

Presently, hermaphrodite calipers, surface gages, scratch gages, universal dividers and beam compasses or trammels are utilized in the layout of circles. Each of these instruments is characterized by certain deficiencies which impair their usefulness as general purpose instruments. In view of this, it is the principal object of this invention to provide a novel instrument construction which may be utilized in place of the above noted instruments for the purpose of laying out circles, such as bolt circles.

It is a further object of this invention to provide a novel instrument as above indicated which may be utilized to scribe straight lines a given distance from the edge of a workpiece.

It is a further object of this invention to provide a novel scribing instrument which is inexpensive to manufacture and extremely simple to utilize. The instrument includes an instrument body having a scribing staff movably carried thereby. Adjustable guide means are secured to the body with the staff extending parallel to a line bisecting the angle formed by the arms of the guide means. Means for locking the movement of the staff and for locking the guide means in a desired adjusted position are provided. A scribing point is carried by the staff for marking the desired surface.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is an elevational plan view of the scribing instrument illustrating how it may be utilized to scribe a circle concentric to a bore;

FIGURE 2 is a fragmentary side elevational view of the scribing instrument;

FIGURE 3 is an enlarged vertical sectional view taken substantially along the plane 3—3 of FIGURE 1;

FIGURE 4 is an enlarged sectional view taken substantially along the plane 4—4 of FIGURE 1;

FIGURE 5 is a perspective view of the scribing instrument;

FIGURE 6 is a bottom elevational view of the instrument particularly illustrating the cooperating features of the guide arms; and FIGURE 7 is a perspective disassembled view of the instrument body and the guide arms adjustably attached thereto.

With continuing reference to the drawings, numeral 10 generally represents the scribing instrument comprising this invention and including principally an instrument body 12, guide means generally designated as 14, and a scribing staff 16.

The instrument body 12 is substantially T-shaped having a cross member 18 and a depending member 20. The body 12 is provided with a central bore 22 extending through the depending member 20 and cross member 18. Slidably received in the bore 22 is a scribing staff 16. The scribing staff 16 is provided with a threaded forward end portion 24 adjacent a reduced section 26. A nut 28, in the form of a cap, is adapted to be threaded on the portion 24. The nut 28 has an aperture 30 on the upper side thereof for receiving a scribing point 32 therethrough. The point 32 extends through an open rectangular section 34 in the nut 28, opposite to the aperture 30. The scribing point 32, it will be noted, extends through the aperture 30 and open rectangular section 34, in contact with the reduced end 26 of the staff 16, enabling the nut 28 to bear against the scribing point 32 to secure it as indicated particularly in FIGURES 5 and 6.

As noted, the staff 16 is slidable in the bore 22 of the body 12. However, means particularly illustrated in FIGURE 3 are provided for locking the staff 16 to prevent it from sliding movement when desired. The depending member 20 of the body 12 is provided with an aperture 36 extending perpendicular to the bore 22. The aperture 36 extends through the depending member 20 as particularly illustrated in FIGURE 3 and receives a collar 40 therein provided with a central opening 42 for receiving the staff 16 therethrough. The collar 40 has a threaded neck 44 fixed thereto and threadably received in a central threaded cavity 46 of a knurled knob 48. The knurled knob 48 has a lower flat surface 50 which bears against the upper surface of the depending member 20 as indicated at FIGURE 3. It will be apparent that by turning the knurled knob 48, the threaded neck 44 will be raised through the threaded cavity 46 as the flat surface 50 of the knob 48 bears against the depending portion 20 of body 12. Of course, this action will cause the collar 40 to bear against the staff 16 so as to prevent it from longitudinal movement relative thereto. Therefore, it will be appreciated that the staff 16 may be locked from movement at any desired position relative to the body 12.

The guide means, generally designated as 14, include a pair of guide arms 52 and 54. Each of the guide arms 52 and 54 is pivoted to the body 12. Apertures 56 and 58 are provided in the cross member of the T-shaped body 12. Referring particularly to FIGURE 4, it is to be noted that a pivot pin 60 of substantially cylindrical shape is received within the opening 58. A threaded neck 62 is secured to the pivot pin 60 with a knurled knob 64 threadably and centrally receiving the threaded neck 62. The pivot pin 60 is provided with a reduced portion 66 having a flared end 68 with the guide arm 54 pivotally received thereon. It is to be appreciated that the reduced and flared ends 66 and 68 as indicated are receivable within the aperture 70 provided in the guide arm 54. As noted above with reference to the lock means for the staff 16, the guide arm 54 may be locked from pivotal movement by turning the knurled knob 64 so as to raise the threaded neck 62, the pivot pin 60, and guide arm 54 to frictionally engage it with the body 12. The guide arm 54 is provided with a pair of transverse extensions 72 and 74 defining a U-shaped socket 76 therebetween. The guide arm 52 is provided with a transverse extension 78 receivable within said socket 76 as indicated in FIGURE 7, adapted to bear against the extensions 72 and 74. Guide arm 52 is provided with an aperture 80 for receiving the lower reduced and flared end 82 of a pivot pin 84 having an enlarged flange 86. The pivot pin 84 is received within aperture 56 as indicated in FIGURE 4. It will be apparent that, with knurled knob 64 loosened, the guide arms 52 and 54 may be pivoted relative to the body 12 and staff 16 with the extension 78 and socket 76 cooperating so as to assure that the staff 16 at all times extends parallel to a line bisecting the angle between the guide arms 52 and 54. Guide pins 88 are terminally received in the guide arms 52 and 54 within the openings 90 provided.

It is felt that the constructional details of the scribing instrument should now be apparent and the utilization of the instrument will now be discussed. By loosening the knurled thumb knob 64, the guide arms 54 and 52 are free to pivot. When utilized with a bore 100 in a workpiece, as indicated in FIGURE 1, the guide pins 88 may be placed within the bore 100 with the guide arms 54 and 52 extended to their extremes so that a line drawn between the guide pins is coincidental with the diameter of the bore 100. The staff 16 may then be slidably moved in bore 22 so that a concentric circle of any size may be scribed about the bore 100 as indicated in FIGURE 1. It should be apparent that the instrument may be just as easily utilized with the guide pins 88 bearing against the outside diameter of a workpiece. Also, it will be noted that the instrument may be utilized to scribe straight lines a desired distance from the edge of a workpiece by running the guide pins along the edge.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A scribing instrument comprising a single one-piece body, a scribing staff movably carried by said body, and adjustable guide means secured to said body for properly orienting said instrument, said adjustable guide means including a pair of pivotally mounted guide arms and guide pins terminally carried by said guide arms, the pivoted end of one of said arms having a pair of transverse extensions defining an intervening U-shaped socket therebetween, the other one of said arms having its pivoted end provided with a projection, said projection received in said socket between said extensions whereby a pivoting of said second arm will cause said projection to bear against one of said extensions to cause a similar pivoting of said first arm.

2. A scribing instrument comprising a one piece body, a scribing staff slidable in a bore provided therefor in said body, adjustable guide means secured to said body for properly orienting said instrument, said adjustable guide means including a pair of pivotally mounted guide arms and guide pins terminally carried by said guide arms, a first of said arms having a pair of transverse extensions defining a U-shaped socket therebetween, a second of said arms having a projection formed thereon, said projection received in said socket between said extensions whereby a pivoting of said second arm will cause said projection to bear against one of said extensions to cause a similar pivoting of said first arm, and manually regulatable locking means mounted on said body for selectively retaining said guide arms in a desired pivotal relationship.

3. A scribing instrument comprising a single rigid body, a scribing staff slidable in a bore provided therefor in said body, and adjustable guide means for properly orienting said instrument, said staff slidably received in said bore means for selectively retaining said staff in a desired position in said bore, said adjustable guide means including a pair of duplicate divergent guide arms having converging ends superimposed against a cooperating flat surface of an underneath side of said body and pivotally joined to said body in a manner to operate in unison and in a corresponding manner, guide pins terminally carried by said guide arms, a first of said arms having a pair of transverse extensions defining a U-shaped socket therebetween, a second of said arms having a projection formed thereon, said projection received in said socket between said extensions whereby a pivoting of said second arm will cause said projection to bear against one of said extensions to cause a corresponding pivoting of said first arm.

4. A scribing instrument comprising a J-shaped body, a scribing staff movably carried by said body, and adjustable guide means secured to said body for properly orienting said instrument, a longitudinal bore extending through said body, said staff slidably received in said cavity and means for selectively retaining said staff in a desired position in said bore, said adjustable guide means including a pair of pivotally mounted guide arms and guide pins terminally carried by said guide arms, a first of said arms having a pair of transverse extensions defining a U-shaped socket therebetween, a second of said arms having a projection formed thereon, said projections received in said socket between said extensions whereby a pivoting of said second arm will cause said projection to bear against one of said extensions to cause a similar pivoting of said first arm, and a removable scribing point terminally carried by a distal end of said staff, said distal end being screw threaded and provided with a screw cap screwed on said screw threads and serving as a retaining nut for said scribing point.

5. For use in scribing a line of a predetermined nature on a prescribed surface of a particular workpiece, a manually usable scriber comprising, in combination, an elongated linearly straight staff having a screw threaded distal end provided with a screw cap equipped with an applicable and removable scribing pen, a single body slidable on a median portion of said staff and provided with means also slidable on the staff for adjusting and securely retaining the body in any desired position along the length of the staff, said means embodying a collar having a passage for the staff and having a screw threaded stud provided with a thumb nut including a finger gripping knob, a pair of coplanar companion arms disposed in divergent relationship and having converging ends pivotally mounted on a underneath side of said body and provided at outer ends with guide pins whose axes are at right angles to the lengthwise axes of the respective arms, and means carried by one arm and cooperable with said body for locking both arms simultaneously in angular relationship on said body.

6. The structure defined in claim 5 and wherein the inner end of one arm is pivotally connected to the body, the inner end of the other arm having a pivot pin extending through said body, said pivot pin having an upstanding screw-threaded stud, and a locking nut mounted on said stud and cooperable with said body and provided with a finger gripping knob.

7. A scribing instrument comprising a body substantially T-shaped in plan and embodying a head portion and a stem portion at right angles to the head portion, said body having a bore providing a passage for an insertable and removable scribing staff, a pair of arms disposed in divergent relationship and having converging ends underlying an underneath side of said head, an inner end of one arm benig pivoted to an end portion of the head, an inner end of the other arm being removably pivoted to the other end of said head and including a pivot pin provided with a screw threaded stud carrying a thumb nut engaging the top side of the body, the outer distal ends of said arms being provided with guide pins, the inner converging ends between the pivot points being hingedly and operatively linked together for simultaneous and corresponding operability.

References Cited in the file of this patent

UNITED STATES PATENTS

| | | |
|---|---|---|
| 79,052 | Blaisdell | June 23, 1868 |
| 1,017,994 | Owen | Feb. 20, 1912 |
| 1,503,934 | Akashi | Aug. 5, 1924 |
| 2,717,446 | Gomes | Sept. 13, 1955 |